United States Patent [19]

Sturt

[11] 4,011,283

[45] Mar. 8, 1977

[54] POLYMERIZATION PROCESS

[75] Inventor: Alan Charles Sturt, Guildford, England

[73] Assignee: BP Chemicals Limited, London, England

[22] Filed: Mar. 19, 1973

[21] Appl. No.: 342,370

Related U.S. Application Data

[63] Continuation of Ser. No. 107,855, Jan. 19, 1971, abandoned.

[30] Foreign Application Priority Data

Feb. 6, 1970 United Kingdom ............... 5798/70

[52] U.S. Cl. .................... 260/880 R; 260/878 R; 260/879; 260/881; 260/884; 260/885; 260/886
[51] Int. Cl.$^2$ ......................................... C08L 9/08
[58] Field of Search ............... 260/880 R, 880, 879, 260/881, 884, 885, 886, 878 R

[56] References Cited

UNITED STATES PATENTS

| | | | |
|---|---|---|---|
| 3,370,105 | 2/1968 | De Bell | 260/880 R |
| 3,436,440 | 4/1969 | Abe et al. | 260/880 R |
| 3,548,034 | 12/1970 | Cleeman | 260/885 |
| 3,657,172 | 4/1972 | Gallagher | 260/881 |
| 3,663,655 | 5/1972 | Sturt | 260/885 |
| 3,663,657 | 5/1972 | Sturt | 260/885 |

Primary Examiner—Paul R. Michl
Attorney, Agent, or Firm—Brooks Haidt Haffner & Delahunty

[57] ABSTRACT

Non-film forming polymers produced as an aqueous emulsion are recovered by adding a monomer and polymerizing under suspension conditions.

5 Claims, No Drawings

POLYMERIZATION PROCESS

This is a continuation of application Ser. No. 107,855 filed Jan. 19, 1971 now abandoned.

The present invention relates to a process for the production of polymeric material by the polymerization of monomeric material in aqueous dispersion.

The polymerisation of monomeric material in aqueous dispersion is well known. When the dispersion and the produced polymeric material is in the form of fine droplets or particles which have been stabilized by means of emulsifying agents and the like to such an extent that the aqueous dispersion is stable when any mechanical stirring used to maintain it is stopped, the polymerisation process is known as emulsion polymerisation. When the dispersion and the produced polymeric material is in the form of larger droplets or particles which only coalesce or settle out from the aqueous phase when the mechanical stirring is stopped, the polymerisation process is known as suspension polymerization. Suspension systems are usually present in a suspension process in order to control the particles size and to ensure that the suspension does not break down during polymerisation. The instability of suspension polymerisation processes is particularly marked in the initial stage of the polymerisation, i.e. before 50% polymerisation is achieved.

Emulsion polymerisation has certain advantages over suspension polymerisation in that it can readily be operated with little reactor fouling at a high ratio of monomeric/polymeric material to aqueous phase. However, when applied to the production of non-film forming polymer such as ABS (acrylonitrile, polybutadiene, styrene copolymer) it is difficult to eliminate fine particles which render the final product difficult to handle. Such fine particles may present an explosion hazard if they become electrostatically charged.

An object of the present invention is to provide an improved process for polymerisation in aqueous dispersion.

Accordingly the present invention is a process which comprises polymerising under emulsion polymerisation conditions a first monomeric material other than vinyl chloride that gives rise to a non-film forming polymer, allowing the emulsion polymer to absorb a second monomeric material, transforming the emulsion system into a suspension system and polymerising the absorbed second monomeric material under suspension polymerisation conditions.

By a non-film forming polymer is meant a polymer which has a glass transition temperature ($T_G$) above 10° C. Such polymers are incapable of forming a coherent film when deposited on a suitable substrate from an aqueous emulsion thereof and allowed to dry at temperatures below about 10° C, say 5°–10° C.

Any substantially water-insoluble monomeric material other than vinyl chloride that gives rise to a non-film forming polymer can be emulsion polymerised in the first stage of the process according to the present invention provided that the emulsion polymer produced is capable of absorbing the monomeric material used in the second stage. Many water-insoluble monomeric materials that can give rise to non-film forming polymers are known and have been polymerised by emulsion and/or suspension polymerisation systems. Examples are ethylene, propylene, styrene, acrylonitrile, methyl methacrylate and vinyl esters such as vinyl acetate. The monomeric material can consist of a mixture of monomers, one or more of which may give rise to film forming homopolymers, provided that the copolymer formed from the mixture is a non-film forming polymer. Examples of such comonomers are butadiene, isoprene, chloroprene and ethyl acrylate. The first monomeric material used in the suspension stage may be the same as or different from the second monomeric material used in the emulsion stage.

The emulsion polymer is either present as an emulsified latex or as a suspension when it absorbs the second monomeric material. The emulsion polymer may be mixed with other emulsion polymers before the suspension polymerisation stage of the process. The technique can lead to the production of useful blended products. The added emulsion polymer need not necessarily be a non-film forming polymer.

The essential requirement for the monomeric material present in the second stage polymerisation of the process of the present invention is that it is capable of being absorbed by the emulsion polymer of the first stage. Any of the aforementioned monomers can be employed and also vinyl chloride. Monomers that produce film forming polymers can also be employed. The quantity of second monomeric material is preferably not greater than the amount of monomeric material that the emulsion polymer can absorb under prevailing conditions, although larger amounts can be employed if desired. The weight of monomeric material employed in the second stage is suitably not greater than the weight of emulsion polymer present. In practice the polymer to monomer ratio lies in the range 50:50 to 97.5:2.5 and is preferably in the range 70:30 to 92.5:7.5.

The process of the present invention can be particularly usefully applied in the production of ABS resins (acrylonitrile/polybutadiene/styrene copolymers). Such resins conventionally contain about 5 to 30% weight polybutadiene, 40 to 80% styrene and 10 to 30% weight acrylonitrile. The first stage of such an embodiment can be a conventional emulsion ABS process and the monomeric material used in the final suspension stage of the process can be a mixture of styrene and acrylonitrile amounting to about 10% by weight of the first stage emulsion ABS copolymer.

The emulsion polymerisation stage of the process may be carried out in the presence of a suitable emulsifying agent using the well known emulsion polymerisation techniques. These are, for example, described in volume IX of the series of monographs on the chemistry, physics and technology of high polymeric substances published by Interscience Publishers, Inc., New York.

Conventional components of polymerisation systems can be present in the emulsion polymerisation stage of the present invention, e.g. polymerisation initiator systems, preferably water-soluble, molecular weight modifiers and the like. These are chosen according to the requirements of the monomeric material being polymerised. Conventional phase ratios of organic to aqueous phases can be employed.

When sufficient emulsion polymer has been formed, the emulsion polymer particles are allowed to absorb the second monomeric material. This material is preferably added to the emulsion polymer latex but in the case where the second monomeric material is the same as that used in the first stage to make the emulsion polymer, the emulsion polymer may absorb monomer as it is formed and thus during the emulsion polymerisation stage a point will arise when the formed polymer will have absorbed therein a minor proportion of monomeric material. Thereafter and at any time subsequently while the polymerisation system contains monomeric material, the emulsion polymerisation system can be transformed into a suspension system according to the present invention.

In order to transform the emulsion system into a suspension system, it is necessary to destroy the emulsion in the presence of a suspension stabiliser system which prevents complete coagulation of the polymeric material.

The emulsion system is suitably transformed by reducing the efficiency of the emulsifying agent employed by, for example, adding acids or multi-valent ions, e.g. aluminium ions, to the system, or in appropriate cases, diluting the emulsion or altering the degree of agitation in the system. In a preferred embodiment of the present invention the emulsifying agent used in the first stage of the process is the salt of a carboxylic acid, which acid is not an emulsifying agent. In this embodiment the emulsion system is destroyed by the addition of a relatively strong acid to the system thus facilitating the formation of the suspension system. Examples of suitable carboxylic acid salt emulsifying agents are the carboxylic acid soaps and resin acid salts e.g. alkali metal or ammonium salts of disproportionated resin acids, oleic acid, lauric acid, stearic acid, palmitic acid and myristic acid.

A suspension stabiliser system is present during the second stage of the process of the present invention in order to ensure that the polymerisation of the second monomer takes place under suspension polymerisation conditions. Suspension stabiliser systems are well known and can contain suspending agents of the organic or inorganic type and can be water soluble or insoluble. Examples of suitable organic suspending agents are polyvinyl alcohol, partially hydrolysed polyvinyl acetates, salts of styrene-maleic anhydride copolymers, gelatins, cellulose ethers such as methyl cellulose, hydroxypropyl methyl cellulose and hydroxyethyl cellulose. Examples of suitable inorganic suspending agents are sparingly soluble metal phosphates such as hydroxy apatite. Mixtures of organic and inorganic suspending agents and of water soluble and insoluble suspending agents can be used.

Conventional suspension polymerisation conditions can be employed in the final polymerisation stage of the process of the present invention. It is often found possible to use a higher ratio of organic phase to aqueous phase than can be used in processes in which the monomeric material is polymerised entirely under suspension conditions. Thus it is possible to convert a highly concentrated emulsion polymerisation system to a suspension system without necessarily having to add further quantities of water.

To aid the polymerisation of the absorbed monomeric material a polymerisation initiator may be added. As is conventional in suspension polymerisation systems, the polymerisation initiator is most suitably soluble in the absorbed monomeric material. Any of the many known suspension polymerisation initiators can be employed. Examples are tertiary butyl perbenzoate, di-t-butyl peroxide, di-benzoyl peroxide, tert-butyl acetate and t-butylperoxyisopropylcarbonate.

The product of the process of the present invention can be isolated by the means conventionally used for suspension polymers. The products behave like conventional suspension polymers in that they can be recovered by simple filtration or decantation techniques and moreover the individual polymer particles retain their identity in suitable recovery processes. This is in marked contrast to the polymeric material recovered from conventional emulsion polymerisation processes by aggregation of the emulsion polymer particles. The aggregated product tends to break down again to particles of emulsion polymer size when subjected to shear during conventional heating and drying procedures.

The present invention is illustrated by the following examples relating to the manufacture of an ABS resin. The parts quoted are by weight.

EXAMPLES 1 to 6

An ABS latex was made by polymerising 150 parts by weight of a mixture of styrene and acrylonitrile in the presence of 50 parts (dry weight) of a polybutadiene latex. The emulsifier used in the polymerisation was the potassium salt of a disproportionated resin acid. The ABS latex had a solids content of 28.6%. The transformation to suspension conditions and the subsequent polymerisation were carried out with this ABS latex in 2 liter stirred glass reactors. A styrene acrylonitrile mixture was used as the second monomeric material, acetic acid as destabiliser and polyvinyl alcohol as suspending agent. There were 25 parts of monomer to 75 parts of polymer. In all cases the monomer appeared to be fully absorbed by the polymer when the suspension polymerisation began. The basic recipe was as follows.

| | |
|---|---|
| ABS latex (28.6% solids) | 699 g. |
| Water | 431 g. |
| Styrene | 32.5 g. |
| Acrylonitrile | 17.5 g. |
| Lauroyl peroxide | 0.8 g. |
| Polyvinyl alcohol (85% hydrolysed, medium viscosity) - 4% solution | 62.5 ml |
| Acetic acid (10% w/v) | 7.3 ml |

The monomers and lauroyl peroxide were mixed before used. The ABS latex was charged into the reactor. Each solution was added with stirring over a period of 5 mins. and the batch was stirred for 5 mins. after each addition. The batch was then heated to 70° C at which polymerisation took place. A series of runs was carried out with different orders of addition.

EXAMPLE 1

The additions were made in the order: acid, monomer solution, suspending agent. The product was mainly beads with an average size of about 0.5 mm. Analysis in a vibrating sieve showed that 99.9% of the product had a particle size >0.1 mm.

EXAMPLE 2

The additions were in the order: acid, suspending, agent and then monomer solution. The product was mainly in the form of beads in the range 0.5 to 1.0 mm. and 99.9% of the product had a particle size >0.1 mm.

EXAMPLE 3

The additions were made in the order: suspending agent, acid and then monomer solution. Most of the product was in the form of beads in the range 0.5 to 1.0. Vibrating sieve analysis showed that 99.9% of the product had a particle size >0.1 mm.

EXAMPLE 4

The additions were made in the order: suspending agent, monomer solution and then acid. Vibrating sieve analysis showed that 99.9% of the product had a particle size >0.1 mm. and 70% > 0.5 mm.

EXAMPLE 5

The additions were made in the order: monomer solution, acid and then suspending agent. The product was mainly in the form of coarse lumps, 99.9% > 0.1 mm. and 99% > 0.5 mm.

EXAMPLE 6

The additions were made in the order: monomer, suspending agent and then acid. Vibrating sieve analysis showed that 99.9% of the product had a particle size > 0.1 mm. and 89% > 0.5 mm.

EXAMPLE 7

Example 4 was repeated with the ratio of polymer to monomer increased to 90/10. The recipe was as follows.

| | |
|---|---|
| ABS latex (28.6% solid) | 699 g. |
| Water | 91 g. |
| Styrene | 11.5 g. |
| Acrylonitrile | 5.5 g. |
| Lauroyl peroxide | 0.27 g. |
| Polyvinyl alcohol solution | 54.0 ml |
| Acetic acid (10% w/v) | 7.3 ml |

The product was mainly in the form of beads and had the following sieve analysis.

| Mesh No. | Wt. % retained |
|---|---|
| 4 | 7.7 |
| 10 | 4.2 |
| 14 | 7.7 |
| 30 | 45.8 |
| 44 | 16.1 |
| 60 | 8.9 |
| 150 | 8.9 |
| 200 | 0.6 |
| above | 0 |

EXAMPLE A — COMPARATIVE

A comparative example was carried out with the same ABS latex as in Examples 1-7 except that the monomer and initiator were omitted. The recipe was

| | |
|---|---|
| ABS latex (28.6% solids) | 699 g. |
| Water | 297 g. |
| The polyvinyl alcohol solution | 50 ml |
| Acetic acid (10% w/v) | 50 ml |

The latex was diluted and acidified. The suspending agent was then added and the mixture heated as in the other examples.

The latex formed a suspension which was readily filtered. The product had a generally finer particle size than the products of Examples 1-7 and it stuck to the sieve because of electrostatic charging so that the analysis is not exact. After the sieves had been weighed a brush was used to loosen the material and the sieving was continued for a further 15 min. The same procedure was continued for 90 mins. in all.

It can be seen from the following sieves analysees that the polymer particles were breaking down the even under the low shear conditions of a vibrating sieve.

| | Polymer Retained % Sieving Time | | | | |
|---|---|---|---|---|---|
| Meth No. | 30 min. | 45 min. | 60 min. | 75 min. | 90 min. |
| 4 | 1.7 | 0.9 | 0.6 | 0.5 | 0.5 |
| 10 | 13.0 | 9.5 | 4.8 | 3.1 | 2.4 |
| 14 | 6.0 | 6.5 | 5.4 | 4.3 | 3.8 |
| 30 | 16.3 | 18.5 | 16.6 | 16.1 | 15.4 |
| 44 | 14.5 | 14.4 | 15.9 | 13.1 | 14.6 |
| 60 | 13.8 | 9.6 | 11.5 | 12.2 | 12.0 |
| 150 | 19.5 | 18.3 | 19.3 | 22.2 | 21.8 |
| 200 | 11.5 | 15.9 | 16.9 | 19.2 | 20.0 |
| Above | 4.1 | 6.4 | 9.0 | 9.3 | 9.7 |

EXAMPLE B — COMPARATIVE

An ABS latex was prepared in a similar way to that used in the previous examples. The latex was coagulated with acetic acid and heated to cause the particles to agglomerate. The following vibrating sieve analyses shown that the dried product contained a considerable proportion of fines. After 30 min. the sieve was weighed and then brushed to loosen particles which stuck to the seive because of electrostatic charging. Sieving then continued for a further 15 min.

| | Polymer retained (%) Sieving Time | |
|---|---|---|
| Meth No. | 30 min. | 45 min. |
| 4 | 0 | 0 |
| 10 | 0 | 0 |
| 14 | 1.0 | 0.4 |
| 30 | 6.5 | 6.2 |
| 44 | 7.5 | 7.0 |
| 60 | 9.0 | 8.7 |
| 150 | 51.9 | 46.5 |
| 200 | 7.6 | 1000 |
| Above | 15.7 | 20.0 |

Clearly the proportion of fines was increasing as the particles broke down in the vibrating sieve. These sieve values are probably low because of electrostatic charging.

EXAMPLE 8

A polystyrene latex was made with sodium lauryl sulphate emulsifier. The above process was then carried out with 90 parts of latex solids to 10 parts of styrene. The recipe was as follows.

| | |
|---|---|
| Polystyrene latex (22.1% solids) | 1130 g. |
| 4% polyvinyl alcohol solution | 69.5 ml |
| Styrene | 28 g. |
| Benzoyl peroxide (70%) | 0.4 g. |
| Calcium chloride (10% solution of dihydrated) | 20 ml. |

The polyvinyl alcohol was stirred into the latex for 5 min. Next the styrene containing the benzoyl peroxide was added over 5 min. and stirred in for a further 10 min. Finally the system was destabilised by adding the calcium chloride solution over 5 min. and stirring it for a further 15 mins. At this stage the styrene monomer appeared to be fully absorbed by the polystyrene. The batch was then heated to 85° C for 3 hours. Virtually 100% conversion was achieved. The product was mainly in the form of beads, about 97% of which were > 0.1 mm.

I claim:

1. A process which comprises polymerising under emulsion polymerisation conditions a first monomeric material other than vinyl chloride that gives rise to a non-film forming polymer having a glass transition temperature above 10° C in aqueous emulsion, said first monomeric material being selected from the group consisting of ethylene, propylene, styrene, acrylonitrile, methyl methacrylate, a vinyl ester, butadiene, isoprene, chloroprene, ethyl acrylate and mixtures thereof, allowing the emulsion polymer to absorb an amount of a second monomeric material selected from the group consisting of ethylene, propylene, styrene, acrylonitrile, methyl methacrylate, a vinyl ester, butadiene, isoprene, chloroprene, ethyl acrylate, vinyl chloride, and mixtures thereof not greater than the weight of the emulsion polymer, destroying the emulsion by adding an acid or a multivalent ion in the presence of a suspension stabilising system, and polymerising the absorbed second monomeric material under suspension polymerising conditions.

2. A process as claimed in claim 1 wherein the polymer to second monomeric material ratio lies in the range 70:30 to 92.5:7.5.

3. A process as claimed in claim 1 wherein the first monomeric material gives rise to an acrylonitrile/polybutadiene/styrene copolymer (ABS resin) and the second monomeric material is a mixture of styrene and acrylonitrile.

4. A process as claimed in claim 3 wherein the mixture of styrene and acrylonitrile amounts to about 10% by weight of the first stage emulsion acrylonitrile/polybutadiene styrene copolymer.

5. A process as claimed in claim 1 wherein the emulsifying agent used in the first stage polymerisation is the salt of a carboxylic acid which is not an emulsifying agent and the emulsion system is transformed into a suspension system by the addition thereto of an acid.

* * * * *